US012723615B2

(12) United States Patent
Vishne

(10) Patent No.: US 12,723,615 B2
(45) Date of Patent: Sep. 1, 2026

(54) RAPID INSTALLATION SCREW WITH RADIALLY EXPANDING THREADS

(71) Applicant: Sandisk Technologies, Inc., Milpitas, CA (US)

(72) Inventor: Gadi Vishne, Petach-Tikva (IL)

(73) Assignee: Sandisk Technologies, Inc., Milpitas, CA (US)

( * ) Notice: Subject to any disclaimer, the term of this patent is extended or adjusted under 35 U.S.C. 154(b) by 170 days.

(21) Appl. No.: 18/222,859

(22) Filed: Jul. 17, 2023

(65) Prior Publication Data

US 2024/0337282 A1 Oct. 10, 2024

Related U.S. Application Data

(60) Provisional application No. 63/457,582, filed on Apr. 6, 2023.

(51) Int. Cl.
*F16B 35/02* (2006.01)
*F16B 35/04* (2006.01)

(52) U.S. Cl.
CPC ............ *F16B 35/042* (2013.01); *F16B 35/02* (2013.01)

(58) Field of Classification Search
CPC ........................................................ F16B 35/02
USPC .................................................. 411/383, 385
See application file for complete search history.

(56) References Cited

U.S. PATENT DOCUMENTS 2,693,732 A * 11/1954 Durst ...................... F16B 35/02 411/385
2,892,376 A * 6/1959 Schonfeld ............... F16B 35/02 411/63
3,159,075 A * 12/1964 Bjork ...................... F16B 35/02 411/383
3,456,547 A * 7/1969 Strong .................. F16B 13/126 294/102.1
3,922,946 A * 12/1975 Grayson ................ F16B 35/02 411/385
4,478,546 A * 10/1984 Mercer ................... F16B 35/02 411/385
4,488,843 A * 12/1984 Achille ............... F16B 19/1081 411/72

(Continued)

FOREIGN PATENT DOCUMENTS

WO WO-0208616 A1 * 1/2002 ............. F16B 35/02

*Primary Examiner* — Flemming Saether
(74) *Attorney, Agent, or Firm* — Pearl Cohen LLP

(57) ABSTRACT

A rapid installation screw includes radially expanding threads. The screw may include a number of discrete thread segments removably affixed to a distal end of an internal shaft. Initially, the thread segments may together have an outer diameter that allows them to slide into a screw hole without engaging threads of the screw hole. Thereafter, a further downward force on the screw will disconnect the thread segments from the internal shaft so that the internal shaft can move axially down between the thread segments. The diameter of the internal shaft forces the thread segments radially outward into engagement with the threads of the screw hole. The internal shaft further includes ribs radially oriented around the internal shaft to fit in between the thread segments. Rotation of the screw head and internal shaft will exert torque on the thread segments, causing them to rotate as well, thus allowing the thread segments to unscrew from the threaded hole.

15 Claims, 7 Drawing Sheets

(56) References Cited

U.S. PATENT DOCUMENTS

| | | | | |
|---|---|---|---|---|
| 4,856,950 | A * | 8/1989 | Bushnell | F16B 19/1081 411/72 |
| 5,090,857 | A * | 2/1992 | Dunn | F16B 35/02 411/908 |
| 5,634,754 | A * | 6/1997 | Weddendorf | F16B 35/02 411/383 |
| 5,704,746 | A * | 1/1998 | Leib | F16B 33/006 411/24 |
| 6,116,942 | A * | 9/2000 | Chen | H01R 13/6215 411/395 |
| 6,322,305 | B1 * | 11/2001 | Bantle | F16B 13/126 411/48 |
| 8,430,616 | B2 * | 4/2013 | Wesley, Jr. | F16B 35/02 411/419 |
| 9,217,455 | B1 * | 12/2015 | Woodall, Jr. | F16B 35/02 |

* cited by examiner

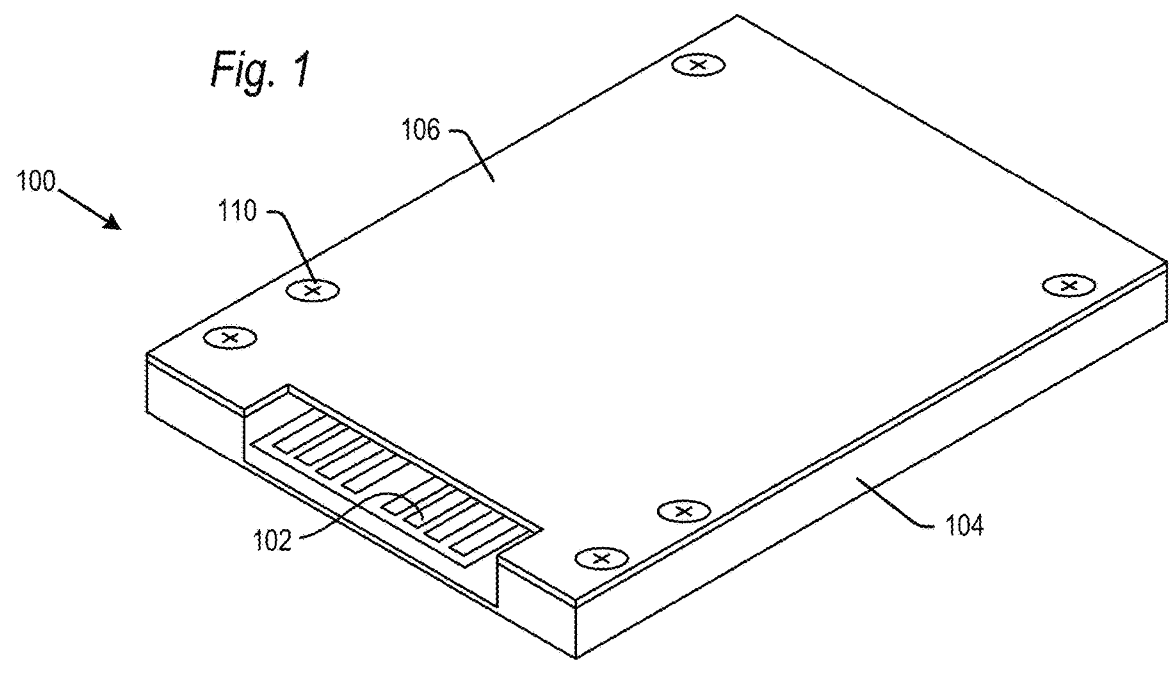
Fig. 1
100
106
110
102
104
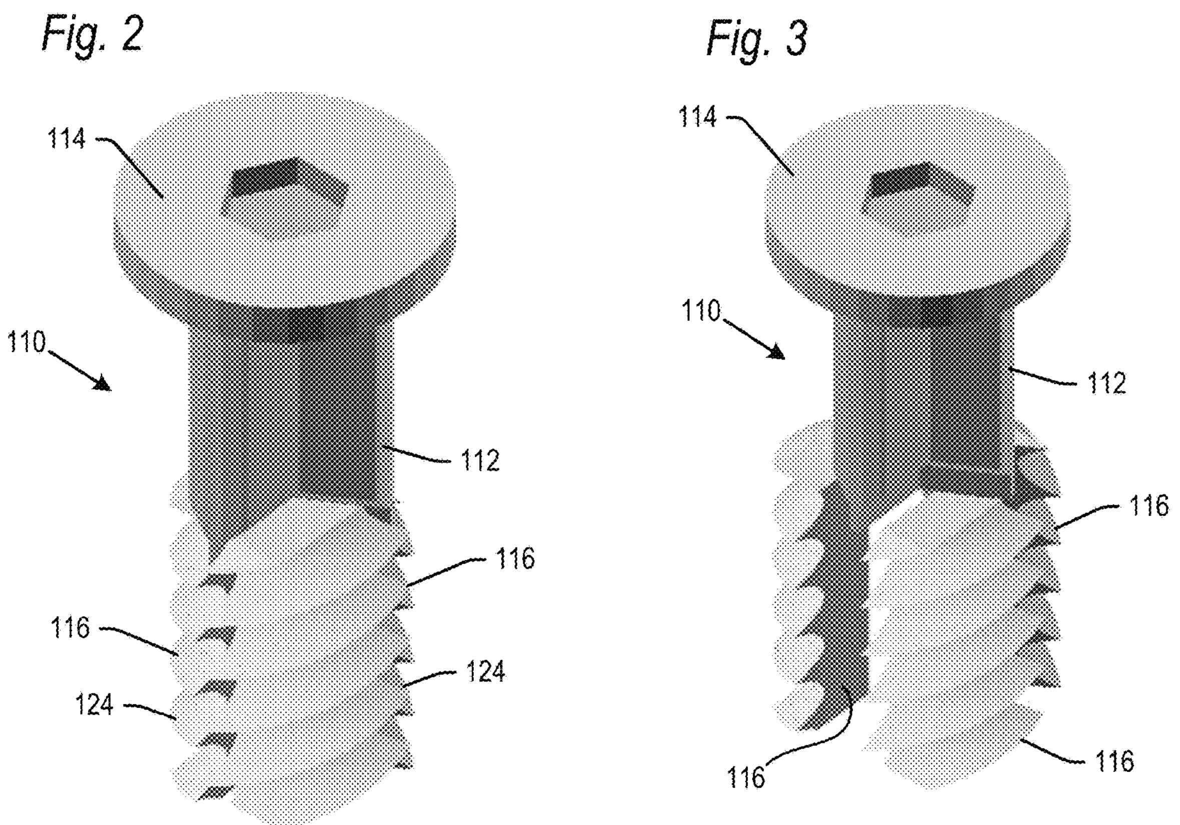
Fig. 2
114
110
112
116
116
124
124
Fig. 3
114
110
112
116
116
116

114
112

110
120
120
116
124
124
116
106
OD
ID
122
104
126

114
110
112
106
10
10
A
A
116
126
122a 110
106
112
138
114

Fn
116
126
122a 114
110
116
116
112
116
122

114
110
116
116
112
116

RAPID INSTALLATION SCREW WITH RADIALLY EXPANDING THREADS

CLAIM OF PRIORITY

The present application claims priority from U.S. Provisional Patent Application No. 63/457,582, entitled "RAPID INSTALLATION SCREW WITH RADIALLY EXPANDING THREADS," filed Apr. 6, 2023, which is incorporated by reference herein in its entirety.

BACKGROUND

Screws are ubiquitous for securely fastening a first component to at least one second component. Screws have an advantage over other types of fasteners in that, once tightened, they may be unscrewed and removed. As such, screws are used in a wide variety of applications where it may be necessary to at some point disassemble components after initial assembly. One such application is in solid-state drives (SSDs) and other types of memory drives, where screws are used to secure a cover plate onto a base to enclose and protect the memory components of the drive. In such applications, it is often necessary to remove the cover plate to enable modifications, testing and other operations on the internal memory components.

One drawback to the use of screws is the excessive time it takes to screw (i.e., rotate) a screw down to its fully inserted position within a screw hole. This can become even more problematic where an application requires several screws to securely fasten components together.

DESCRIPTION OF THE DRAWINGS

FIG. 1 is a perspective view of a component including a number of screws according to embodiments of the present technology.

FIG. 2 is a perspective view of a screw according to an embodiment of the present technology.

FIG. 3 is an exploded perspective view of a screw according to an embodiment of the present technology.

DETAILED DESCRIPTION

Figure 4:
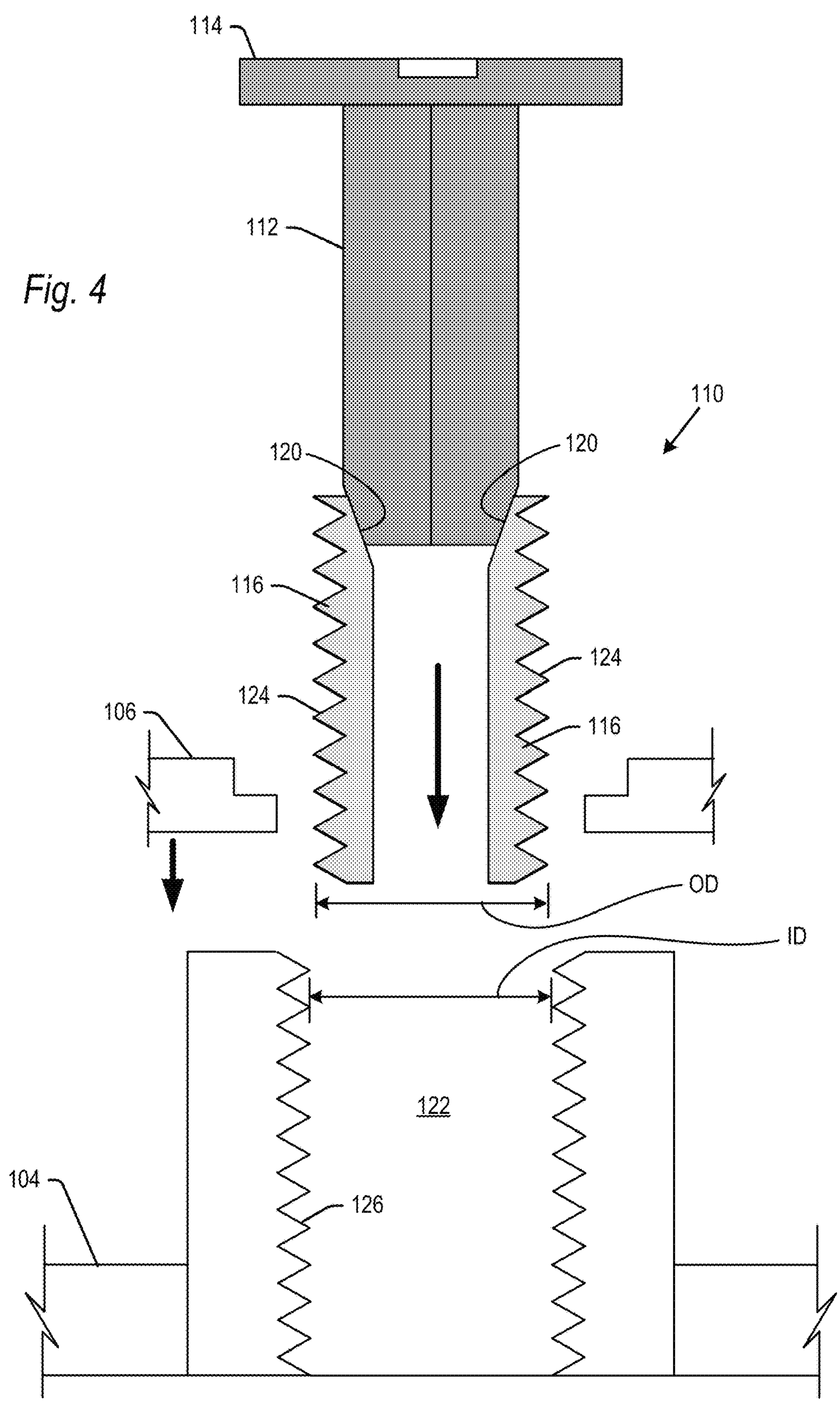
FIG. 4 is a cross-sectional edge view of a screw in an extended position before insertion into a screw hole according to an embodiment of the present technology.

The present technology will now be described with reference to the figures, which in embodiments, relate to a rapid installation screw with radially expanding threads. The screw includes an internal shaft and a screw head affixed to a proximal end of the internal shaft. The screw may further include a number of discrete thread segments, for example removably affixed to a distal end of the internal shaft. Initially, the thread segments may together have an outer diameter that is smaller than the inner diameter of a threaded screw hole into which the screw is to be fastened. Thus, the thread segments may be easily and quickly inserted to the base of the threaded screw hole by sliding axially past the threads of the screw hole.

Thereafter, a further downward force on the screw head will disconnect the thread segments from the internal shaft so that the internal shaft can move axially down between the thread segments. The diameter of the internal shaft will force the thread segments radially outward into engagement with the threads of the screw hole. The screw head and internal shaft are forced axially downward to their full extent, at which point the screw head is flush against the components to thereby securely fasten the components together.

In order to remove the screw, the screw head is engaged by a screwdriver or the like to rotate the screw head and internal shaft. The internal shaft includes ribs radially oriented around the internal shaft to fit in between the thread segments. Thus, rotation of the screw head and internal shaft will exert torque on the thread segments, causing them to rotate as well, thus effectively unscrewing the thread segments from the threaded hole.

It is understood that the present technology may be embodied in many different forms and should not be construed as being limited to the embodiments set forth herein. Rather, these embodiments are provided so that this disclosure will be thorough and complete and will fully convey the technology to those skilled in the art. Indeed, the technology is intended to cover alternatives, modifications and equivalents of these embodiments, which are included within the scope and spirit of the technology as defined by the appended claims. Furthermore, in the following detailed description of the present technology, numerous specific details are set forth in order to provide a thorough understanding of the present technology. However, it will be clear to those of ordinary skill in the art that the present technology may be practiced without such specific details.

The terms "up" and "down," "top" and "bottom," "upper" and "lower" and "vertical" and "horizontal," and forms thereof, as may be used herein are by way of example and illustrative purposes only, and are not meant to limit the description of the technology inasmuch as the referenced item can be exchanged in position and orientation. Also, as used herein, the terms "substantially" and/or "about" mean that the specified dimension or parameter may be varied within an acceptable manufacturing tolerance for a given application. In one embodiment, the acceptable manufacturing tolerance is ±0.15 mm, or alternatively, ±2.5% of a given dimension.

For purposes of this disclosure, a connection may be a direct connection or an indirect connection (e.g., via one or more other parts). In some cases, when a first element is referred to as being connected, affixed, mounted or coupled to a second element, the first and second elements may be directly connected, affixed, mounted or coupled to each other or indirectly connected, affixed, mounted or coupled to each other. When a first element is referred to as being directly connected, affixed, mounted or coupled to a second element, then there are no intervening elements between the first and second elements (other than possibly an adhesive or melted metal used to connect, affix, mount or couple the first and second elements).

An embodiment of the present technology will now be explained with reference to the perspective, edge cross-sectional and top cross-sectional views of FIGS. 1-14. FIG. 1 is a perspective view of a component 100 which may be fastened together using screws according to the present technology. In the illustrated example, component 100 may be a solid-state drive (SSD) comprising pins 102 enabling connection of the SSD to an edge connector of a host device. The internal memory components (not shown) are encased within a base 104 and a cover plate 106 affixed to the base 104 using screws 110 according to the present technology. The illustrated embodiment includes six such screws 110, but it is understood that component 100 may be assembled together using other numbers of screws 110.

In embodiments described herein, the component 100 assembled by screws 110 is an SSD or other memory drives. However, it is understood that the screws 110 may be used to fastened together any of a wide variety of other components in further embodiments. These components may be formed of metal, but as explained below may be formed of other materials including for example natural and synthetic wood structures.

FIG. 2 is a perspective of the screw 110 including an internal shaft 112, a screw head 114 integrally formed on a first, proximal end of the internal shaft 112, and a number of discrete thread segments 116 removably affixed to and surrounding a distal end of the internal shaft 112. FIG. 3 is an exploded perspective view showing the discrete thread segments 116 separated from the internal shaft 112. The screw 110 may be fabricated by a variety of methods, including for example by casting or additive manufacturing (3D printing). Such fabrication methods allow the internal shaft 112 and screw head 114 to be integrally formed with each other, and allow a fragile (i.e., breakable) connection of each of the discrete thread segments 116 to the internal shaft 112.

In one example, each thread segments 116 may be affixed to the distal end of the internal shaft 112 by a breakable tab 120 (FIG. 4). In embodiments, the breakable tab 120 may be broken under a load of 2-5 pounds (force), or other forces that may be manually applied to break the tabs 120 as the screw 110 is inserted into a screw hole as explained below. As is also explained below, in further embodiments, it is possible that screw 110 start out with the thread segments 116 completely separate from the internal shaft 112.

Each of the thread segments 116 may have an arcuate shape in cross-section (FIGS. 2, 3 and 8), and the plurality of thread segments 116 together have a circular footprint in cross-section. Each thread segment 116 may be same length and the length may be slightly less than a depth of a screw hole 122 (FIG. 4) within which the screw 110 is to be inserted. Each thread segment 116 may have an external surface 124 with threads matching in size and pitch to the threads on a surface 126 of the screw hole 122.

Figure 9:
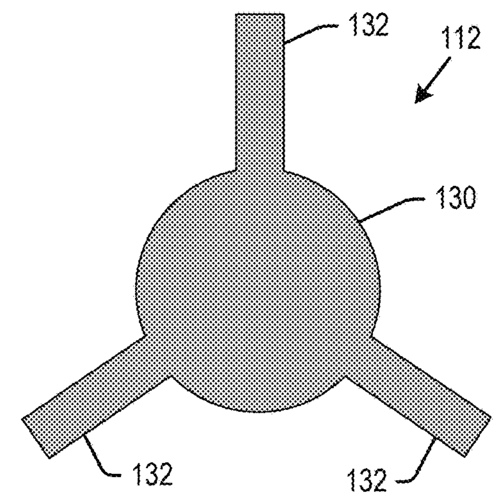
FIG. 9 is a cross-sectional top view of the internal shaft according to embodiments of the present technology.

As shown for example in FIG. 9, in embodiments, the internal shaft 112 may have a cross-section defined by a central circular hub 130 and a number of ribs 132 evenly spaced around the circumference of hub 130 and extending radially from the hub 130. The ribs may also extend along a portion or all of the length of the hub 130. As explained in greater detail below, the ribs 132 are provided to fit between adjacent thread segments 116 when the screw 110 is in a compacted state, and in embodiments, the number of ribs 132 may match the number of discrete thread segments 116. In one embodiment, there may be three ribs 132 and three discrete thread segments 116. There may be two ribs and thread segments, or more than three ribs and thread segments, in further embodiments, including for example four, five or six ribs 132/thread segments 116.

In embodiments, internal shaft 112, screw head 114 and thread segments 116 of screw 110 may each be formed out of a metal such as for example stainless steel, aluminum or alloys of steel and aluminum. The internal shaft 112, screw head 114 and thread segments 116 of screw 110 may be formed of other materials in further embodiments, including for example hard polymers or ceramics. In embodiments, each of the internal shaft 112, screw head 114 and thread segments 116 are formed of the same material, but it is conceivable that the thread segments be formed of a different material than the internal shaft 112 and screw head 114.

Figure 5:
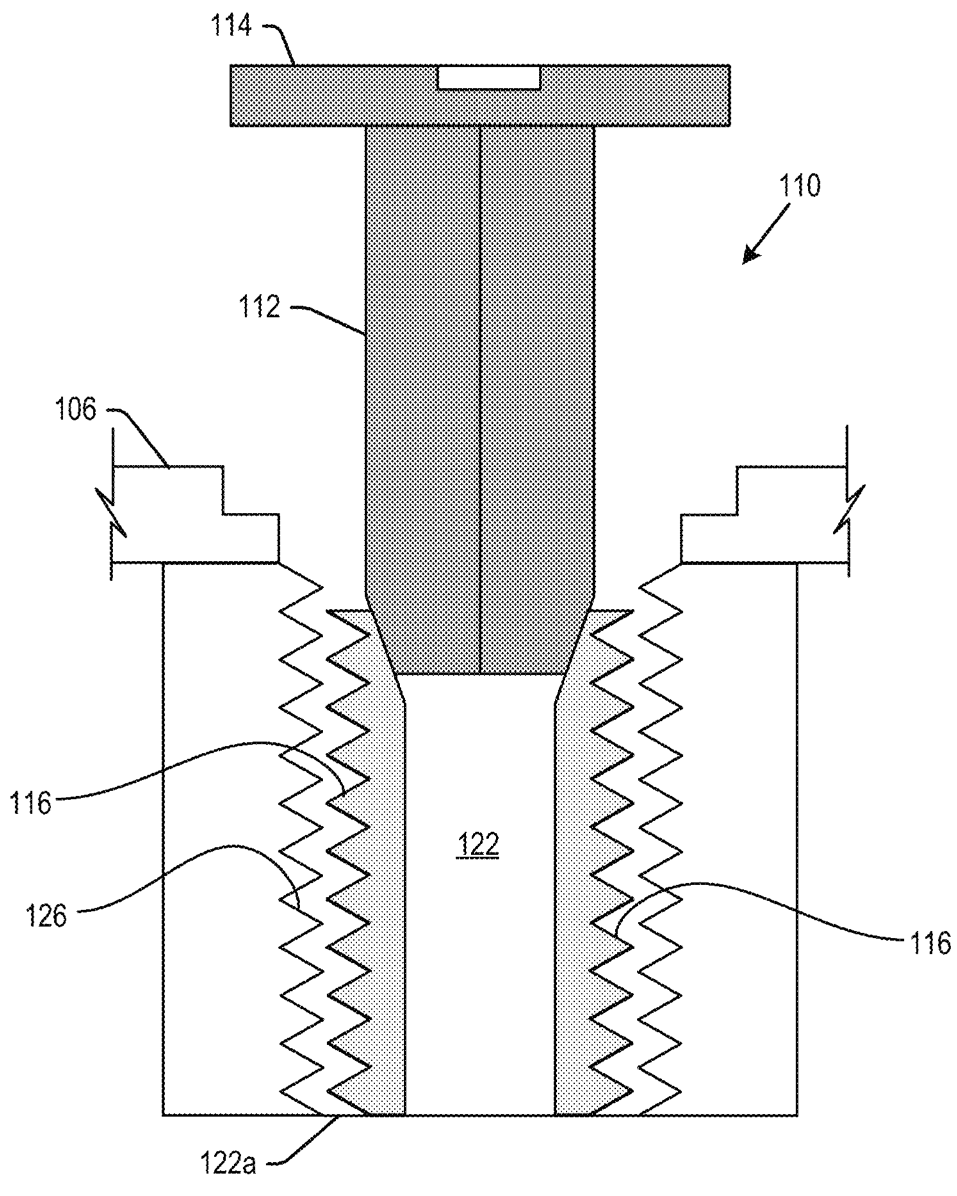
FIG. 5 is a cross-sectional edge view of a screw in an extended position inserted into a screw hole according to embodiments of the present technology.

Referring now to the cross-sectional edge views of FIGS. 4 and 5, screw 110 may fit within a screw hole 122 to affix cover plate 106 to base 104. FIGS. 4 and 5 show the internal shaft 112 and thread segments 116 in an extended state, or extended position. In this position, the thread segments 116 are affixed to a distal end of the internal shaft 112. Affixed to the distal end of internal shaft 112, the threads on the outer surface 124 of thread segments 116 together define an outer diameter, OD, which is less than an inner diameter, ID, of the threads on surface 126 within hole 122. Thus, the thread segments 116 may be quickly and easily inserted to the base 122*a* of screw hole 122 as shown in FIG. 5. Specifically, the screw 110 may be inserted axially down into screw hole 122 until the thread segments 116 contact base 122*a*, sliding axially past the threads on the surface 126 of screw hole 122. Thus, the thread segments 116 may be inserted into the screw hole 122 without the need to rotate any portion of screw 110.

Figure 6:
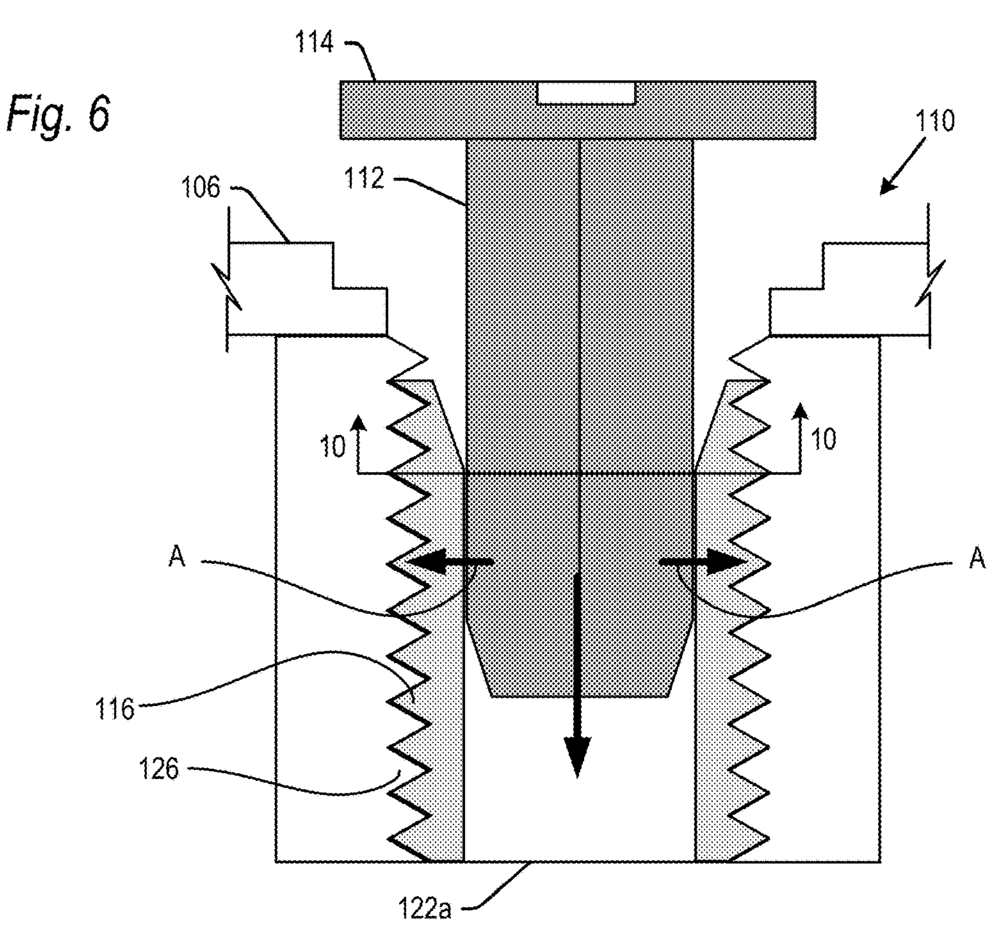
FIG. 6 is a cross-sectional edge view of a screw with the internal shaft moving into the screw hole and forcing the thread segments radially outward according to embodiments of the present technology.
Figure 7:
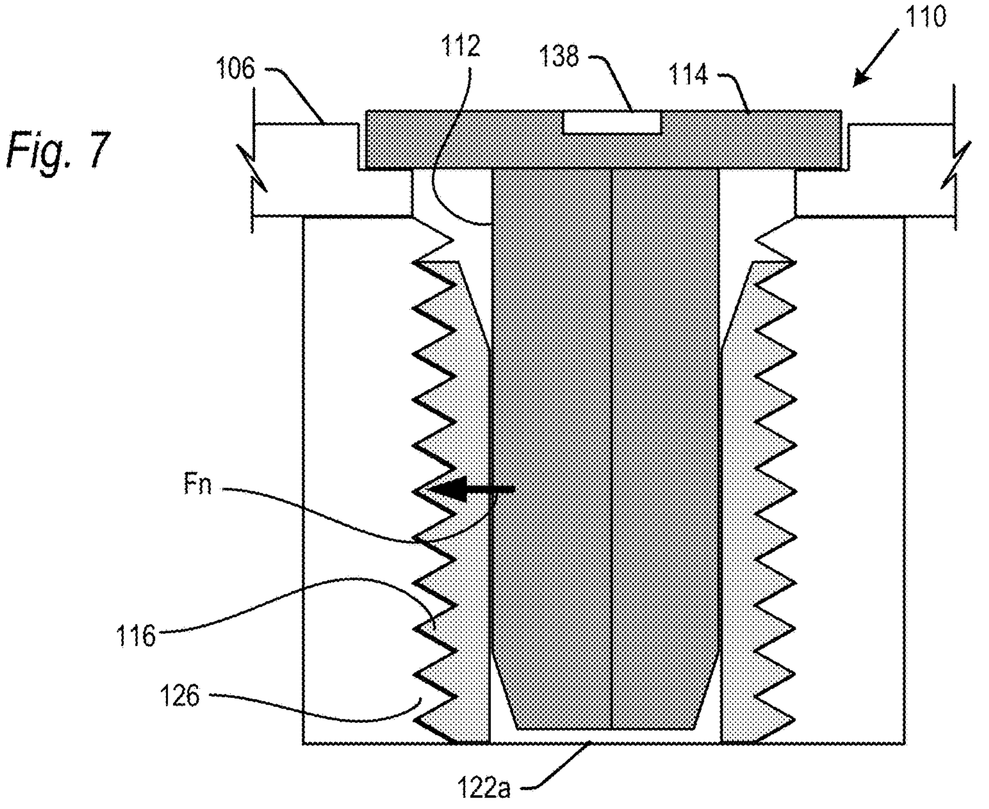
FIG. 7 is a cross-sectional edge view of a screw fully inserted into a screw hole according to embodiments of the present technology.

Referring now to the cross-sectional edge views of FIGS. 6 and 7, once the thread segments 116 are fully inserted to the base 122*a* of screw hole 122, a further axial force on the screw head 114 and internal shaft 112 will break the tabs 120 so that the screw head 114 and internal shaft 112 may then move axially down into a center of the thread segments 116. This axial insertion force on the screw head 114 may for example be exerted by a thumb, finger or palm of an individual inserting the screw 110 into screw hole 122. As the internal shaft 112 moves downward, the central hub 130 (FIG. 9) of the internal shaft 112 will bear against thread segments 116 to move the thread segments radially outward in the directions of arrows A in FIG. 6. This outward radial movement forces the threads on the exterior surface 124 of thread segments 116 into mating engagement with the threads on the surface 126 in screw hole 122.

Further pushing of the screw head 114 and internal shaft 112 axially downward will seat the screw head 114 against the cover plate 106 as shown in FIG. 7. In this position, the screw 110 is in a compacted state, with the thread segments overlapping (fully or partially) the internal shaft. In this position, the screw 110 is also fully inserted within screw hole 122 and the cover plate 106 is securely fastened against the base 104. Thus, in accordance with the present technology, the screw 110 may be fully inserted and fastened within the screw hole 122 purely by an axial force on screw 110 and without any rotation of the screw 110.

The surface roughness of the interior portions 134 (FIG. 9) of thread segments 116 and the hub 130 bearing against each other, as well as the sizing of the radial widths of the hub 130 and thread segments 116, may be controlled to create a normal force, Fn. The normal force Fn is controlled to be sufficiently high to make it difficult to move the internal shaft 112 and head 114 axially relative to the thread segments 116 to thus securely fasten the screw 110 within hole 122 against cover plate 106.

Controlling the frictional normal force, Fn, should be sufficient to prevent unwanted relative movement of the internal shaft 112 relative to the thread segments 116. However, it is possible to add additional features to ensure no such unwanted relative movement. As one example, the hub 130 of the internal shaft 112 may have upwardly pointing pins or tines. These pins/tines allow the internal shaft to be pushed down through the thread segments 116 to move the screw 110 to a compacted position. However, upon any attempted unwanted upward movement of the internal shaft 112 relative to the thread segments 116, the pins or tines dig into the interior portions 134 of thread segments 116, thereby preventing any such unwanted upward movement. Other schemes are contemplated to allow the internal shaft 112 to be pushed down into the thread segments 116, and then prevent upward movement of the internal shaft 112 relative to the thread segments 116.

Figure 8:
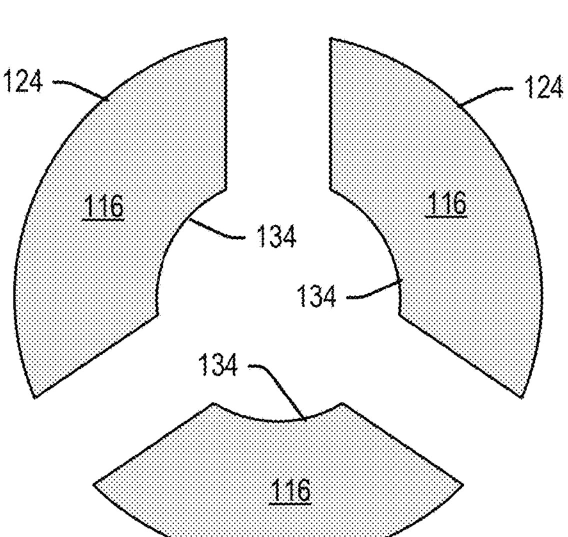
FIG. 8 is a cross-sectional top view of the thread segments according to embodiments of the present technology.
Figure 10:
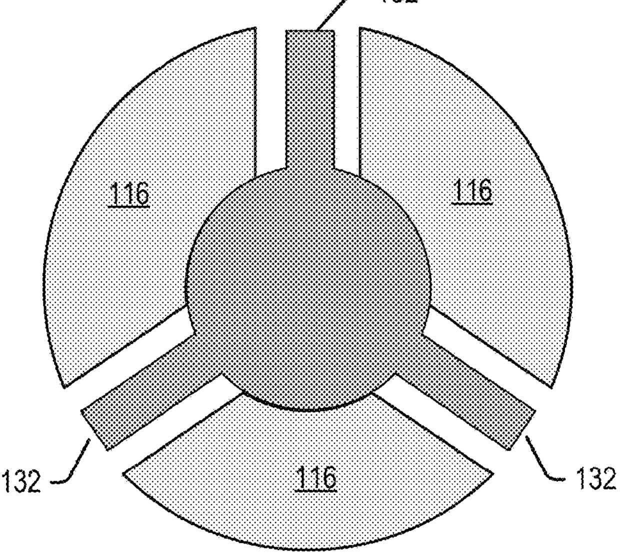
FIG. 10 is a cross sectional top view through line 10-10 of FIG. 6 of the thread segments around the internal shaft according to embodiments of the present technology.

In accordance with aspects of the present technology described above, screw 110 may be easily and quickly secured within screw hole 122 simply by applying an axial force to the screw 110 without the need for rotating, or screwing, the screw 110 into hole 122. In accordance with further aspects of the present technology, if need be, the screw 110 may be removed to allow removal of the cover plate 106, and access to the interior of component 100. Removal of the screw 110 will now be explained with reference to FIGS. 8-14. FIG. 8 is a cross-sectional top view of an embodiment of the thread segments 116, and FIG. 9 is a cross-sectional top view of an embodiment of the internal shaft 112. FIG. 10 is a cross-sectional top view through line 10-10 FIG. 6 of the internal shaft 112 meshing with the thread segments 116.

Figure 11:
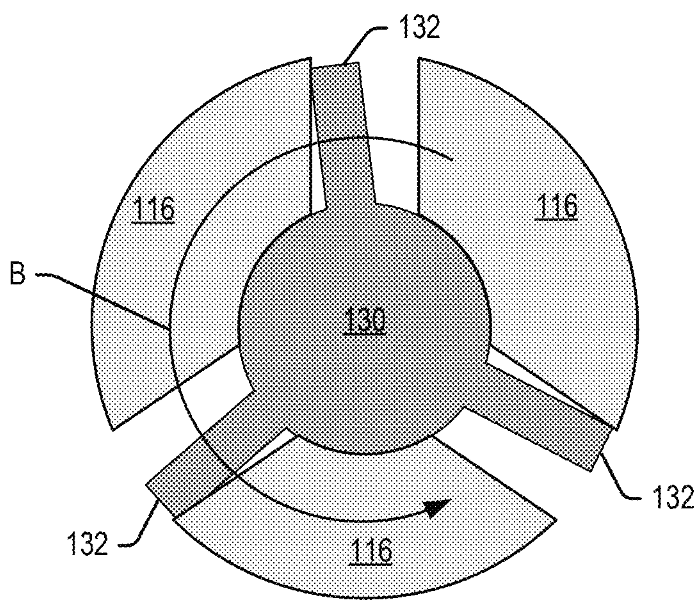
FIG. 11 is a cross-sectional top view of the thread segments being rotated by ribs of the internal shaft according to embodiments of the present technology.
Figure 12:
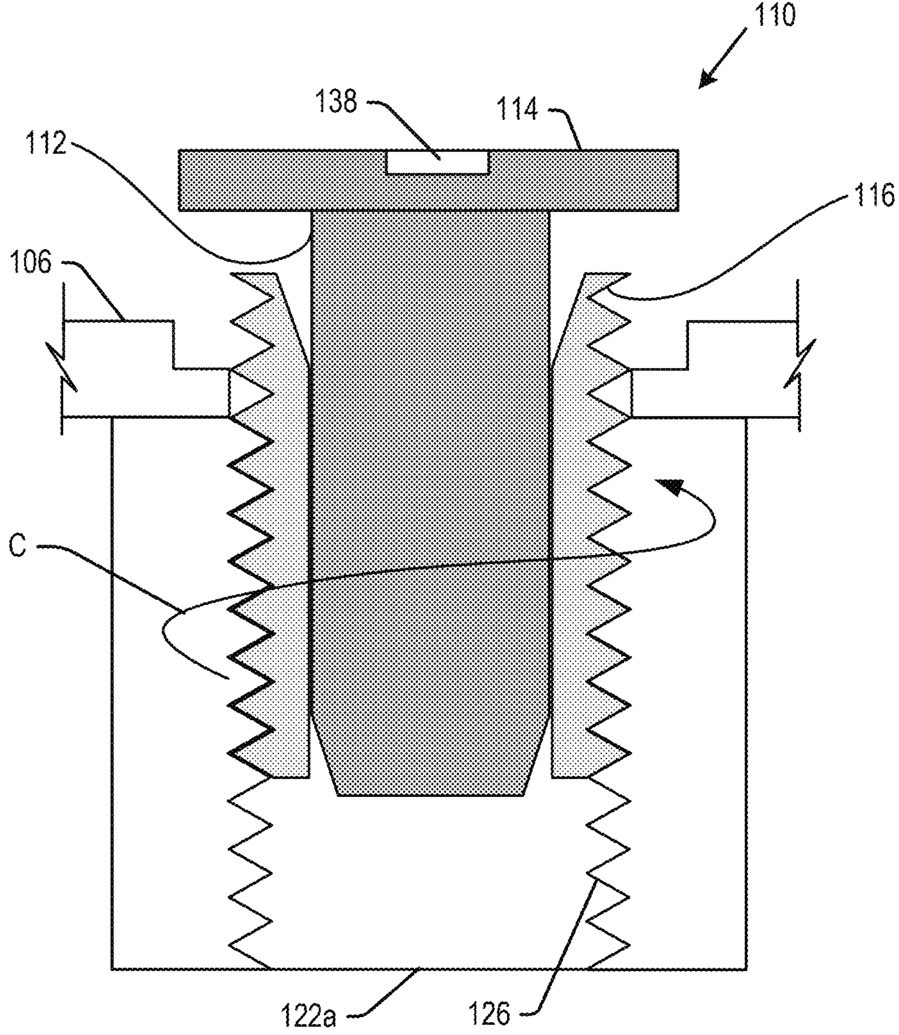
FIG. 12 is a cross-sectional edge view of the thread segments being rotated by ribs of the internal shaft according to embodiments of the present technology.
Figure 13:
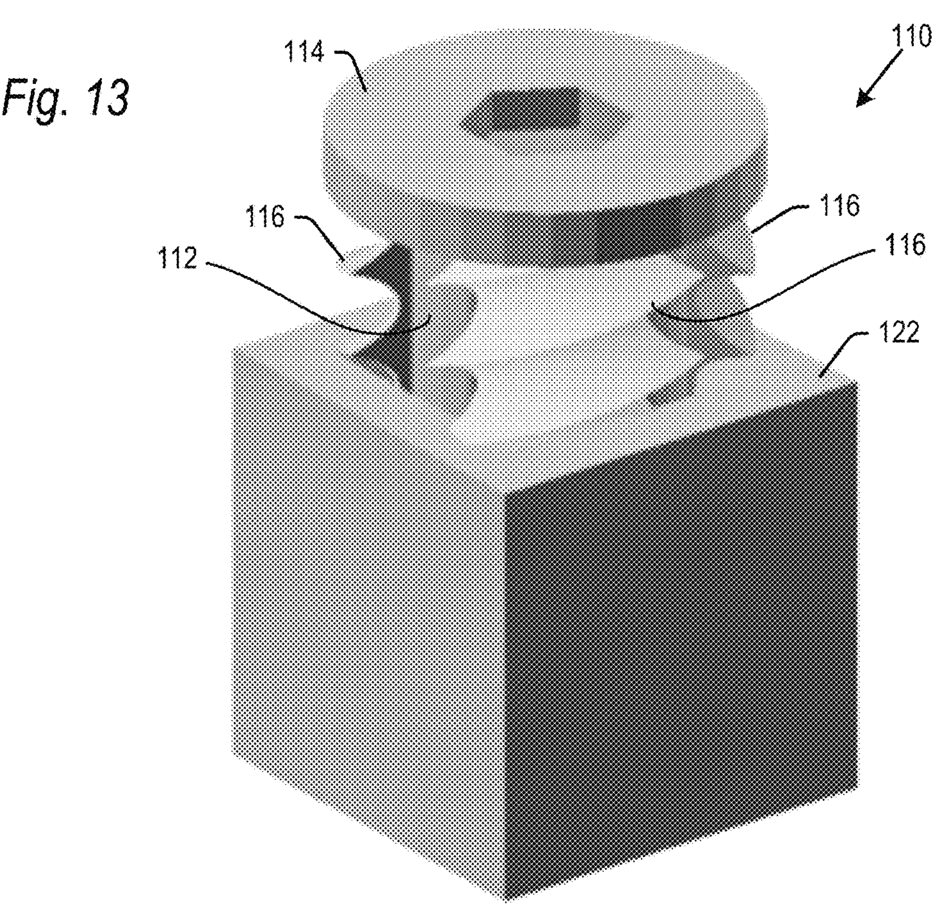
FIG. 13 is a perspective view of a screw being removed from a screw hole according to embodiments of the present technology.

In order to remove the screw 110 from screw hole 122, screw 110 may simply be rotated by a tool such as a screwdriver inserted within the slot 138 (FIG. 7) in screw head 114, in the same manner in which a conventional screw would be unscrewed. As shown in FIG. 11, when the screw is in a compacted state, rotation of the screw head 114 and internal shaft 112 in the direction of arrow B will cause the ribs 132 of the internal shaft 112 to exert a torque against the thread segments 116. At this point, the thread segments 116 rotate with the internal shaft 112 and screw head 114. FIGS. 12 and 13 are a cross-sectional edge view and a perspective view, respectively, of the screw 110 being removed from screw hole 122. As the thread segments 116 rotate, they will move upward (unscrew) from screw hole 122 as indicated by arrow C in FIG. 12, thereby removing the screw 110 from screw hole 122. When in the compacted position, rotation of the screw 110 in the direction opposite to arrows B and C will rotate and tighten the screw 110 back down into the screw hole 122.

Figure 14:
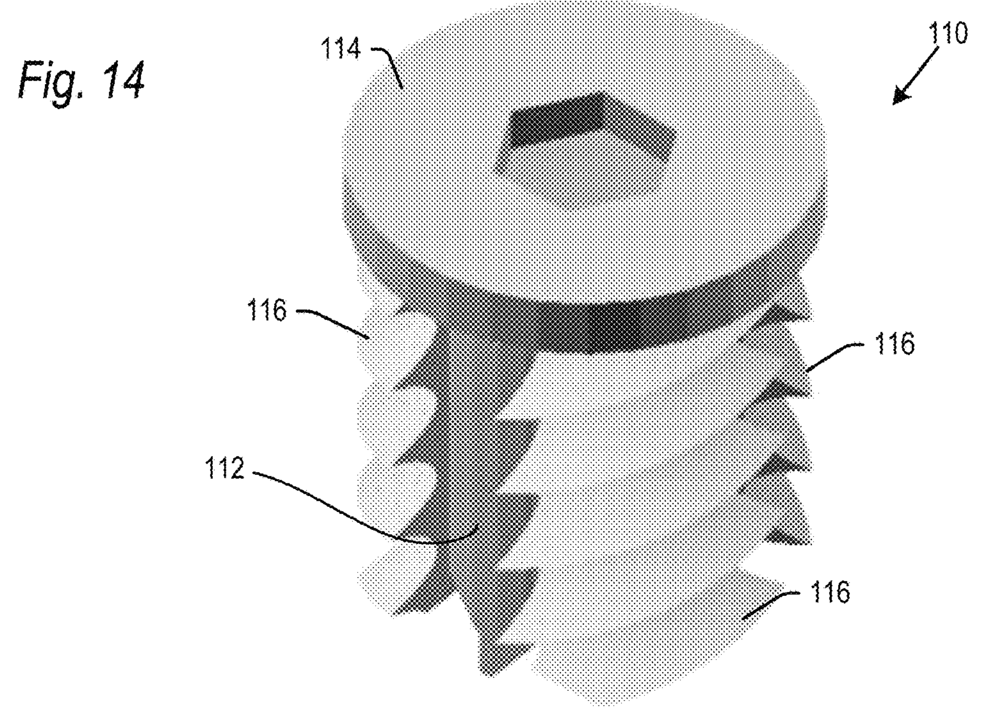
FIG. 14 is perspective view of a screw removed from a screw hole according to embodiments of the present technology.

FIG. 14 shows the screw 110 after removal from hole 122 in a compacted state (the thread segments 116 overlapping the internal shaft 112). While the thread segments 116 are shown against the internal shaft 112 in FIG. 14, after removal of the screw 110 from the hole 122, the thread segments are not held together with the internal shaft. The thread segments 116 may fall away from the internal shaft 112 after removal of the screw 110 and be discarded.

In embodiments described above, prior to insertion within screw hole 122, the thread segments 116 are removably affixed to a distal end of internal shaft 112 by tabs 120. In a further embodiment, prior to insertion within screw hole 122, the thread segments 116 may be completely separate from the internal shaft 112 and screw head 114. In such an embodiment, the thread segments 116 may be affixed to each other as by tabs 120 described above so that, together, they have an outer diameter which is less than an inner diameter of the screw hole 122 as described above. In such an embodiment, the thread segments 116 may be pressed into the screw hole 122. Thereafter, the internal shaft 112 and screw head 114 may be pressed axially downward in between the thread segments 116 to force the thread segments 116 to the base **122*a* of screw hole 122 (if not already there). Further insertion of the internal shaft 112 will also force the thread segments 116 radially outward into engagement with the threads of screw hole 122 to thereby fasten the screw 110 within screw hole 122. In this embodiment, the ribs 132 may seat between adjacent thread segments 116 as shown in FIG. 10 and described above, and the screw 110 may be removed (unscrewed) from the screw hole 122 as described above. In addition to providing an alternative to the above-described screw 110 where the thread segments are initially detached to the internal shaft, this embodiment also allows reuse of at least the internal shaft 112 and screw head 114 after being removed from a screw hole 122**.

In embodiments described above, the screw 110 is used to affix together first and second members in the form of a cover plate 106 affixed to a base 104 to provide a sealed enclosure to component 100. As noted, the component 100 may be an SSD, or other memory drive, such as for example a SATA Universal Storage Module™ (USM) memory drive. In such examples, the cover plate is affixed to the drive using a large number of screws, such as for example the six screws shown in FIG. 1. Conventionally, fixing the cover plate using a large number of standard screws would be a time-consuming process. However, in accordance with aspects of the present technology, screws 110 may be used to quickly and easily affix the cover plate simply by pressing each of the screws 110 axially down into their respective screw holes. Should there be a need to later access to the interior of the drive, the screws 110 may be unscrewed as with any standard screw.

As indicated above, the screw 110 may be used in any of a wide variety of other applications to affix together a first member and at least one second member. In one such application, the screw 110 may be used to affix first and second members where at least the second member including the screw hole is made of natural or synthetic wood. In such an embodiment, the thread segments may initially have an outer diameter approximating or just slightly smaller than the inner diameter of the screw hole. Once the thread segments 116 are forced radially outward when the screw goes to a compacted state, the thread segments 116 may bite into the surrounding wood to slightly enlarge the screw hole. This advantageously provides for a tight fit of the screw 110 within the screw hole.

In embodiments described above, the screw segments 116 are each formed of a hard, solid material such as for example stainless steel or aluminum. In further embodiments, the screw segments 116 may each be formed of a soft and/or malleable material, together having a central opening and which may or may not have threads on their exterior surfaces. In such an embodiment, the soft screw segments 116 would initially be forced axially down into the screw hole 122 as described above. Thereafter, the internal shaft 112 would be forced into the central opening forcing the soft screw segments 116 radially outward as described above. Given the outward force, the soft screw segments would bear against, and conform to the shape of, the threads of the screw hole 122. The soft screw segments may thereafter remain in their soft state, or be cured to a hardened state.

In embodiments described above, the screw head 114 is used to bear against a flange in a cover plate 106 to secure the cover plate to the base 104. In further embodiments, the members affixed by the screw 110 may both be threaded so that the thread segments engage the threads of both members to affix the members together. In such an embodiment, it is conceivable that the wider diameter screw head 114 be omitted, and the slot for receiving a screwdriver be formed directly in the internal shaft 112.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

I claim:

1. A screw for fitting into a screw hole, comprising:
a screwhead comprising:
a body having a first surface and a second surface opposed to the first surface, and
a central slot, formed in the first surface of the body, configured to receive a screwdriver;
a plurality of thread segments comprising threads; and
an internal shaft fixedly attached to the second surface of the screwhead, the plurality of thread segments and internal shaft together occupying an extended position where the plurality of thread segments are affixed at a distal end of the internal shaft, and the plurality of threads configured to occupy a compacted position where the plurality of thread segments overlap the internal shaft upon an axial force on the internal shaft disconnecting the plurality of thread segments from the internal shaft, the plurality of thread segments configured to move axially into the screw hole without need of rotation when in the extended position, and the plurality of thread segments configured to rotate out of the screw hole upon insertion of the screwdriver within the central slot and rotation of the screwdriver to rotate the screwhead and internal shaft, the internal shaft in turn rotating the thread segments against a wall of the screw hole when in the compacted position;
wherein the internal shaft comprises a plurality of ribs extending radially from the internal shaft, each of the plurality of ribs positioning between adjacent thread segments of the plurality of thread segments when the internal shaft and plurality of thread segments are in the compacted position.

2. The screw recited in claim 1, wherein the plurality of thread segments each comprise an arcuate shape, and the plurality of thread segments together have a circular footprint.

3. The screw recited in claim 1, wherein the internal shaft comprises a central hub, the central hub forcing the plurality of thread segments radially outward when the internal shaft and plurality of thread segments are in the compacted position.

4. The screw recited in claim 1, wherein the plurality of ribs exert a torque on the plurality of thread segments upon rotation of the internal shaft when in the compacted position, the torque exerted by the plurality of ribs on the plurality of thread segments rotating the plurality of thread segments when in the compacted position.

5. The screw recited in claim 1, wherein the surface of the screw hole comprises second threads, the threads of the plurality of thread segments meshing with the second threads when the plurality of thread segments are in the compacted position.

6. The screw recited in claim 1, wherein the threads of the plurality of thread segments slide axially past the second threads of the screw hole when the plurality of thread segments are in the extended position.

7. A screw for fitting into a screw hole, comprising:
a screwhead comprising:
a body having a first surface and a second surface opposed to the first surface, and
a central slot, formed in the first surface of the body, configured to receive a screwdriver;
a plurality of thread segments configured to be forced axially into the screw hole without a need for rotation of the plurality of thread segments; and
an internal shaft fixedly mounted to the screwhead and initially affixed to the plurality of thread segments and comprising a plurality of ribs;
wherein an axial force on the screwhead inserts the plurality of thread segments into the screw hole and disconnects the internal shaft from the plurality of thread segments, the axial force forcing the internal shaft axially into the screw hole through a center of the plurality of thread segments upon separation of the internal shaft from the plurality of screw segment, positioning of the internal shaft within the plurality of thread segments forcing the plurality of thread segments radially outward into engagement with a surface of the screw hole to fasten the screw within the screw hole, the ribs of the internal shaft positioning between adjacent thread segments upon positioning of the internal shaft within the center of the plurality of thread segments such that rotation of the internal shaft rotates the plurality of thread segments.

8. The screw of claim 7, wherein rotation of the internal shaft and plurality of thread segments moves the screw out of the screw hole.

9. The screw recited in claim 7, wherein plurality of thread segments comprise first threads and the surface of the screw hole comprises second threads, axial movement of the internal shaft through a center of the plurality of thread segments resulting in meshing engagement of the first threads with the second threads.

10. The screw recited in claim 9, wherein the first threads slide axially past the second threads when the plurality of thread segments are forced axially into the screw hole.

11. The screw of claim 7, wherein the internal shaft further comprises a central hub, the ribs extending radially from the central hub, the central hub forcing the plurality of thread segments radially outward into engagement with the surface of the screw hole upon insertion of the internal shaft through the thread segments.

12. The screw of claim 7, wherein the plurality of screw segments comprise three screw segments.

13. The screw of claim 12, wherein the plurality of ribs comprise three ribs.

14. The screw of claim 7, wherein the plurality of thread segments are removably affixed by tabs to a distal end of the internal shaft prior to insertion of the screw into the screw hole.

15. The screw hole of claim 14, wherein the axial force on the internal shaft to force the internal shaft into the screw hole severs the tabs and disconnects the plurality of thread segments from the internal shaft.

* * * * *